Oct. 15, 1968

H. SCHEFFER 3,405,606

CONTROL OF DOUBLE-ACTING PRESSURE
MEDIUM ENERGIZED SERVO-MOTORS

Filed May 2, 1966

INVENTOR
Harry Scheffer
BY
Beaman & Beaman
Attys

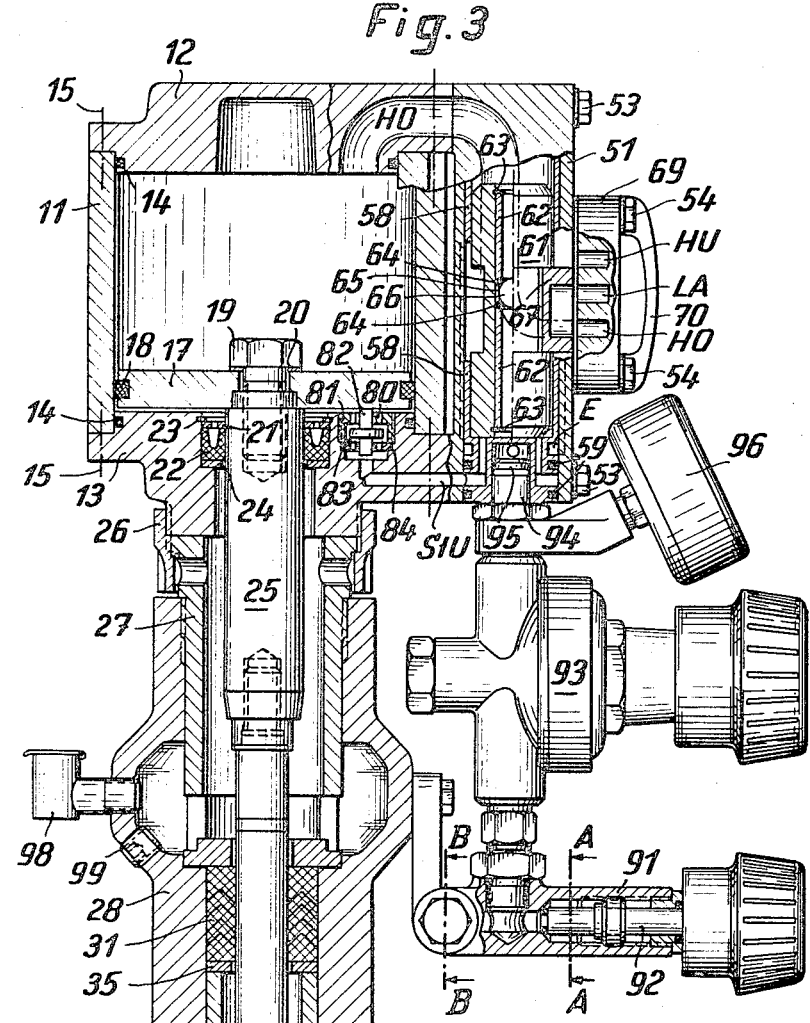
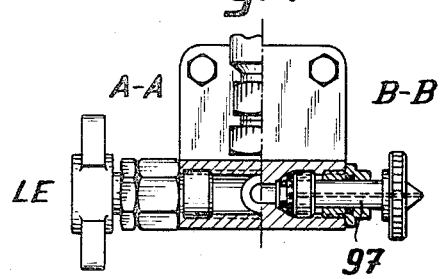
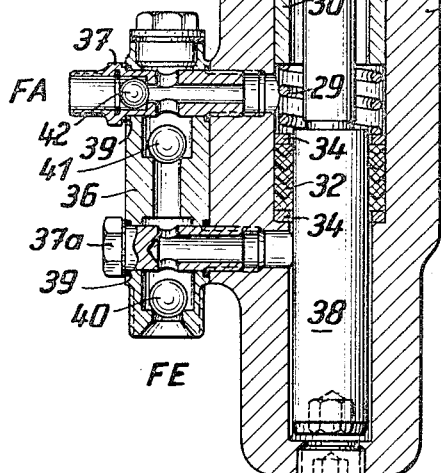

Oct. 15, 1968
H. SCHEFFER
3,405,606
CONTROL OF DOUBLE-ACTING PRESSURE
MEDIUM ENERGIZED SERVO-MOTORS
Filed May 2, 1966
4 Sheets-Sheet 3
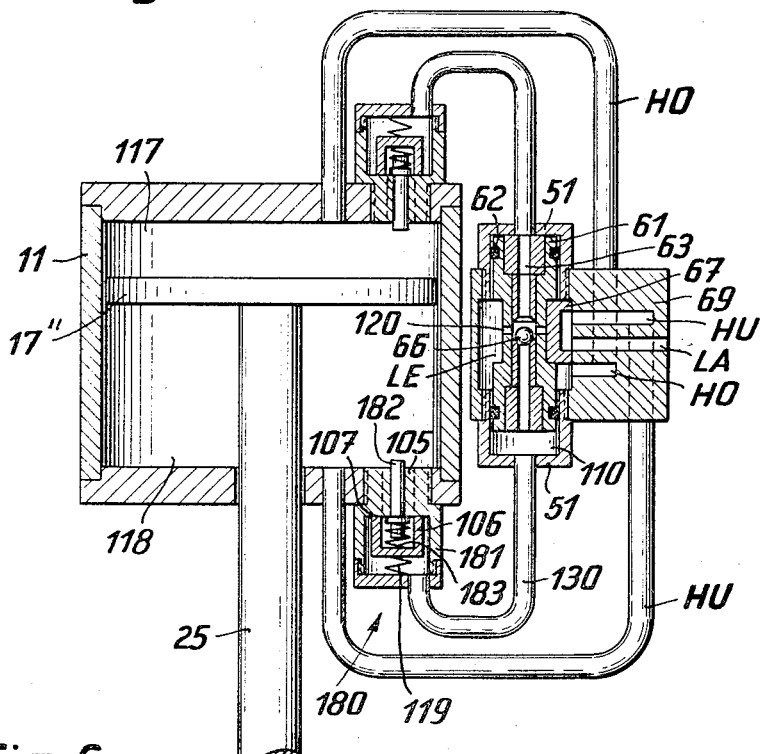
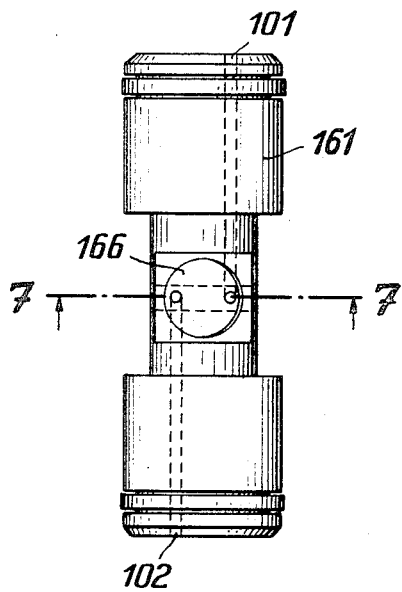
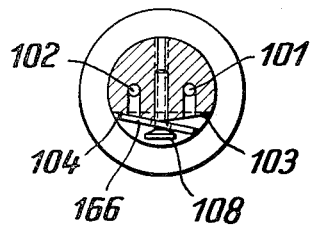
INVENTOR
Harry Scheffer
BY
Beaman & Beaman
attys Oct. 15, 1968 H. SCHEFFER 3,405,606
CONTROL OF DOUBLE-ACTING PRESSURE
MEDIUM ENERGIZED SERVO-MOTORS
Filed May 2, 1966 4 Sheets-Sheet 4

INVENTOR
Harry Scheffer
BY
Beaman & Beaman
attys

United States Patent Office 3,405,606
Patented Oct. 15, 1968

3,405,606
CONTROL OF DOUBLE-ACTING PRESSURE
MEDIUM ENERGIZED SERVO-MOTORS
Harry Scheffer, Hamburg-Lokstedt, Germany, assignor to Harry Kruger G.m.b.H., Hamburg-Lokstedt, Germany
Filed May 2, 1966, Ser. No. 546,736
7 Claims. (Cl. 91—306)

ABSTRACT OF THE DISCLOSURE

A pressurized fluid control for expansible reversing motors capable of permitting a reciprocating operation of the expansible motor solely under the control of a pressure operated valve, eliminating the need for guide rods or the like.

The prior art double-acting single-cylinder pumps are reversed mechanically via guiding rods. The constructions are relatively costly. Wear phenomena and leakages at the entrance of the linkage in the control portion of the pump make it desirable to reverse the power cylinder of such pumps pneumatically or hydraulically.

The invention is therefore based on the problem of providing an especially simple control for double-acting single-cylinder pumps which is positive in the end positions of the working piston because it is not dependent on the adjustment of a linkage.

The invention solves this problem by arranging a control valve at both the upper and lower ends of the power cylinder of the pump which is actuated by means of a gaseous fluid, said control valve being connected with the interior of the control housing via a flow channel, with a symmetric control piston being provided to actuate a control slide and adapted to be displaced between two end positions with the aid of the fluid.

The design and mode of operation of the control without linkage in accordance with the invention will be further described in the following with the aid of some embodiments shown by way of example in the drawing. Further features and advantages of the invention will likewise be seen from the following specification and examples of embodiment shown in the accompanying drawings. In the drawing.

Figure 8:
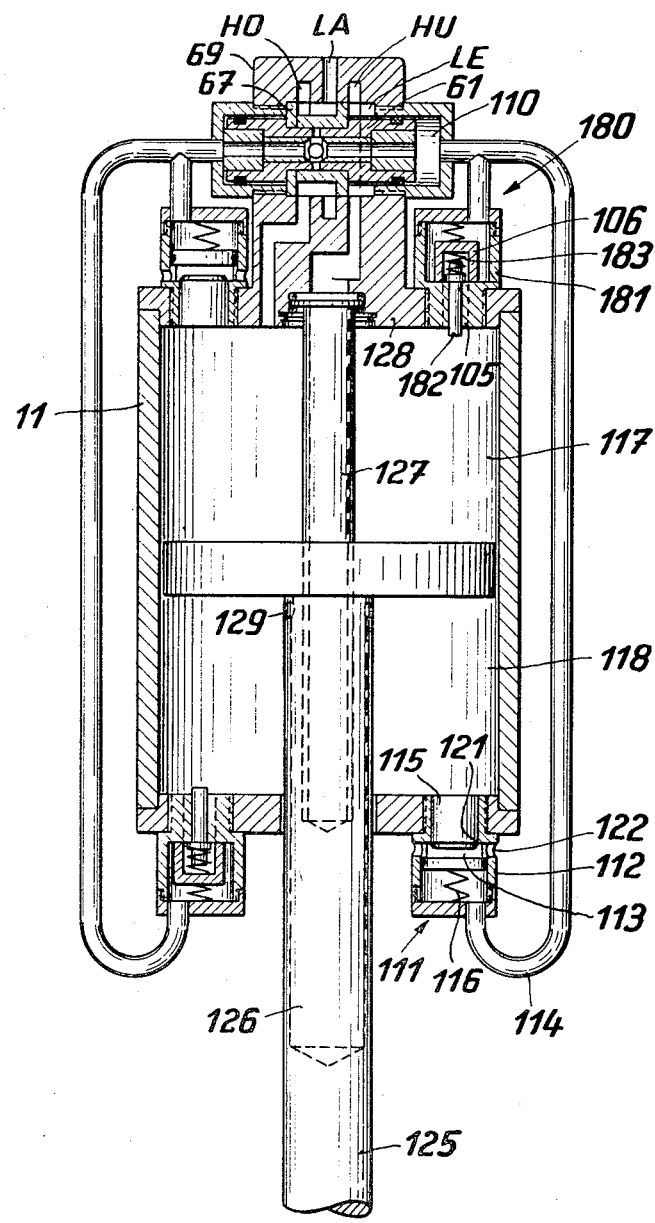

FIG. 3 shows a longitudinal sectional view of another double-acting single-cylinder pump with a reversal control having no linkage in accordance with the invention, FIG. 4 shows a sectional view taken on lines A—A and B—B of FIG. 3, FIG. 5 shows a diagrammatic sectional view to illustrate the design and the mode of operation of the control valves designed in accordance with the invention, FIG. 6 shows a side view of a control valve piston with a plate-shaped valve member according to the invention, FIG. 7 shows a sectional view taken on line 7—7 of FIG. 6, FIG. 8 shows a diagrammatic sectional view of another embodiment of a servo-motor according to the invention comprising new blow-off valves according to the invention.

In the drawings, the communication lines and conduits are shown exposed for the sake of simplicity although with the constructions actually completed, they are extending within the housing walls.

The double-acting single-cylinder servo-motor or pump consists of special suitably designed working cylinder 33, a known per se power cylinder 11 and a control housing 51 with the control device without linkage in accordance with the invention arranged therein.

The power cylinder 11 is respectively covered at its upper and lower ends by cylinder covers 12 and 13. In order to effect a sealing, annular O-rings 14 are provided; the covers are fastened to the cylinder by means of screws 15. A power piston 17 is sealed by means of an O-ring 18 in the power cylinder.

Piston 17 is connected with a piston rod 25 by means of a screw 19 in the form of a countersunk or hexagon screw. Here, an annular O-ring 20 effects the sealing of the upper and lower cylinder chambers with respect to each other.

Figure 1:
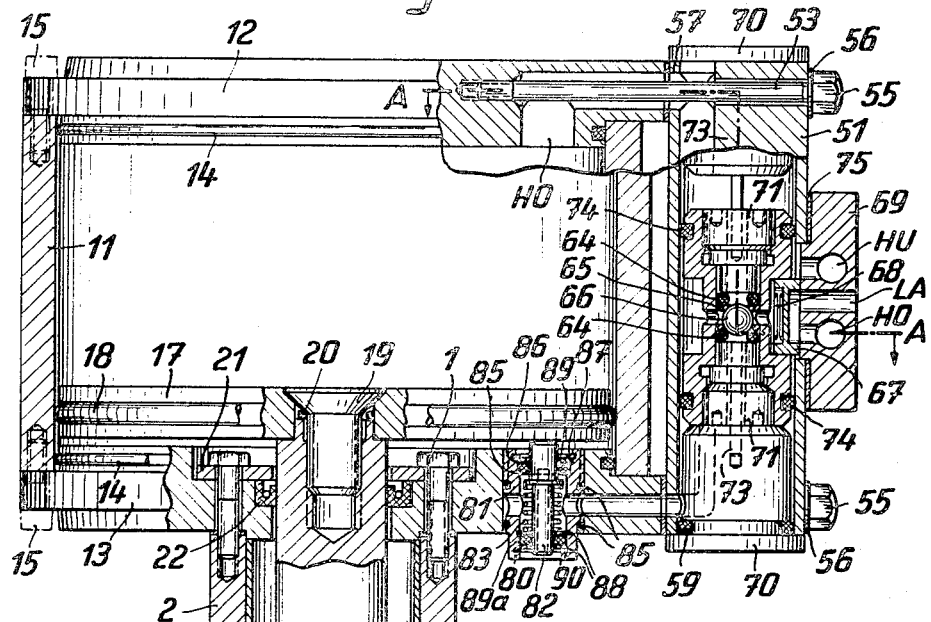
FIG. 1 shows a longitudinal sectional view of a double-acting single-cylinder pump including a reversing control with no linkage in accordance with the invention.
Figure 2:
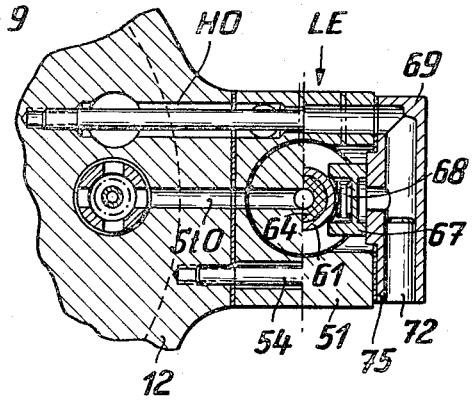
FIG. 2 shows a sectional view taken on line A—A of FIG. 1.

FIG. 1 shows that piston rod 25 has its lower end designed in the manner of a working piston with a built-in check valve. Sealing of the working piston is effected by sealing rings 43 between which the sealing bushing 44 is situated. A piston rod nut 45 retains the sealing on its outer diameter, while the inner diameter is forming the seat for a valve ball 41. In the lower cover 13 of the power cylinder 11, a sealing ring 22 is disposed below a holding disc 21. This holding disc has fastened thereto by means of screws 1 an intermediate flange 2. A sealing prevents leakages at the bores for the screws 1. In the intermediate flange 2, a pressure sleeve 3 is seated which supplies the necessary bias on upper and lower sealing rings 5 and 7 via a prssure disc 4 and an intermediate ring 6. The lower sealing ring 7 abuts a bottom ring 8. The working cylinder 33 is provided with a thread at its upper end which is screwed into the lower portion of the intermediate flange 2. At its lower portion, the working cylinder carries a suction valve 48. Sealings 46 are inserted in the intermediate flange and the suction valve. The valve body of the suction valve forms a valve ball 40 which, in its one end position is abutting a cap 49. This cap 49 is retained by means of a circlip 47. The piston rod 25 is visible through a transverse bore S in the intermediate flange. When the sealing rings 5 and 7 are failing, this opening will prevent the intrusion of the material to be conveyed into the power cylinder.

In the various embodiments similar components are indicated by primes and as shown in FIG. 3 the piston rod 25' carries a differential piston 38 via a thread provided at the lower end thereof. In the lower cylinder cover 13" of the power cylinder 11', there is disposed a sealing ring 22' below a retainer disc 21'. The retainer disc 21' is retainer by means of a circlip 23 and supported by a supporting ring 24. A pressure sleeve 27 is connected with the cylinder cover 13' by means of box nut 26 and screwed into the working cylinder 33'. A pressure disc 28 abuts the pressure sleeve 27. The working cylinder 33' is enlarged in one place where a filling connection 98 and a locking screw 99 are provided. At the outside of the enlarged area, a distributor is additionally fastened. Roof-type collarsets 31, 32 provide a sealing of the differential piston 38 in the working cylinder 33'. A pressure spring 29 generates the necessary bias for the roof-type collarsets 31, 32 via a sleeve 30. Guide washers 34 and 35 may be employed to guide the differential piston 38 if desired. A valve box 36 is flanged to the working cylinder 33' by means of a through-way fitting 37 and a fitting 37a. Sealing rings 39 are employed to effect a sealing. The ball 40' constitutes the valve body for the suction side, while the ball 41' constitutes the valve body for the pressure side when a suction is effected, and a ball 42 serves as a check valve to relieve the pump in case of trouble.

The control having no guiding rods in accordance with the invention consists of the control housing 51' with a control piston valve 61' disposed therein for axial movement, in parallel with the direction of movement of the power piston between two end positions. The control piston valve has connected thereto a slide governing valve 67', with two like relief valves 80' additionally provided at the upper and lower cylinder covers. The control housing 51' is pressure-tightly flanged to the upper and lower cylinder covers 12', 13'.

As is shown in FIG. 1, the control valve housing 51 is fitted in the upper and lower cylinder covers by means of studs 53, short studs 54 and cap nuts 55. Washers 56 are placed between the control housing and the cap nuts. The fluid passages extending within the control valve housing and the cylinder covers are sealed at the point of contact between the housing and the covers by means of flange seals 57. Two control valve housing covers 70 have their journals projecting into the longitudinal through bore in the control valve housing 51 and are sealed by means of O-rings 59. The control valve housing covers 70 are retained by countersunk screws not shown in the drawing. The plugs 52 soldered in the control housing are sealing the passages extending in parallel with the longitudinal through bore but not co-extending therewith, once from above and once from beneath (not visible in the drawings). The control piston which is axially movable within the control housing is formed mirror-symmetrically with respect to the center plane.

The control valves and the control passages as well as the main passages of the fluid are likewise arranged mirror-symmetrically with respect to the center plane of the power piston extending vertically to the axis of the stroke.

The control valve piston 61 is arranged displaceably within the longitudinal bore of the control valve housing 51 between the journals of the control valve housing covers. It is sealed in the longitudinal bore by means of O-rings 74. In the control valve piston 61, each threaded plug 71 is inserted from above and from below. These threaded plugs 71 are retaining two O-rings which are forming valve seats for a ball 66 movable between them as a valve member. The valve seating rings 64 are kept at a certain space from one another by a spacer sleeve 65. The control valve housing covers 70 have inserted therein thin braking studs 73 lifting the valve ball 66 from the sealing rings forming the valve seats at the end of the reversing movement of the control piston 61. The control piston 61 is provided with a contraction at its outer periphery with a slide governing valve 67 fitted therein. The control valve housing 51 is provided with a laterally disposed center opening which is covered by a slide valve face plate 69. The slide 67 is pressed against this slide valve face plate 69 on the inside by means of a spring 68. The slide valve face plate 69 is provided with three bores for the fluid. Of the three channels in this plate the upper and lower channels HU and HO are alternately bored and are closed by plugs 72. The third bore LA serves to discharge the fluid. The slide valve face plate is screwed to the control valve housing 51. A sealing layer 75 is disposed between these two members. Instead of the double-acting check valve in the control valve piston 61, under certain circumstances, also two single-acting check valves may be employed.

The threaded insert 81 of the relief valve 80 has its threaded end threaded into corresponding bores in the cylinder covers 12 and 13. The sealing rings 85 seal the inner space of the valve housing against the atmosphere and the cylinder inner space. The valve pin or body 82 functioning as a valve member has its collar pressed against a sealing ring 89 by means of a valve spring 83, with the sealing ring 89 abutting a circlip 87 via a disc 86. Towards the other side, the valve spring 83 is effective on another sealing ring 89a via a disc 88, said further sealing ring 89a being retained via another disc 88 by a second circlip 90. The sealing rings 89 and 89a are dimensioned such that they have a sealing effect on both their outer and inner periphery. With the valve closed the sealing ring 89 seals in addition the transverse bores 82a in the valve pin 82 by lying close to the collar surface of said pin because said transverse bores 82a are smaller in diameter than the width of the O-ring 89. The transverse bores in the valve body 82 are constantly communicating with the atmosphere through the longitudinal bore in said valve body 82. With the relief valve 80 closed, i.e. with the collar face of the valve body 82 abutting the O-ring 89, the interior of the relief valve is thus sealed against the atmosphere. In the open position, as shown, the interior space of the valve is thus in communication with the atmosphere. In both cases, the inner space of the cylinder is not communicating with atmosphere nor with the interior of the relief valve that means neither with the valve closed nor with the valve in its open position.

Now, the mode of operation of the control of the power cylinder in accordance with FIG. 1 will be described. In the working condition as shown in FIG. 1, the reversal of the piston 17 has just been effected. At this moment, the piston starts its upward movement in the power cylinder, and the fluid—compressed air in the embodiment shown by way of example—flows into the control housing at a point LE. In the side view, the air inlet LE is shown to the rear at the level of LA, that means in the center. Compressed air arrives at the flange surface of the lower cylinder cover 13 through the main passage HU which is disposed in the top portion of the slide valve face plate 69 which is at this moment exposed by the governing slide valve 67, and along a passage (not shown) through an angular bore in the control valve housing 51, the compressed air arrives at the lower cylinder room through an enlarged bore for the lower stud 53. The manner in which this main passage HU extends is a mirror image of the main passage HO shown in the drawing. The piston moves upwardly under the pressure of compressed air entering between the cylinder cover 13 and the power piston 17. The air present in the space between the upper cylinder cover and the power piston flows through the upper main channel HO. This passage extends as an enlarged bore for the studs 53 in the upper cylinder cover 12 into the control valve housing 51 and therein through the angular bore to the slide governing valve face plate 69. The angular bore is closed towards the upper side by the plug 52 fastened in the control housing. The air arriving in the main passage HO is reversed in the slide governing valve 67 and leaves the governing valve face plate by the air exit LA.

During the entire upward movement of the power piston, the pressure of the compressed air is prevailing in the inner space of the control valve. In tne position shown, the compressed air could flow through the transverse bore in the control piston 61 and the spacer sleeve 65, the upper valve seating ring 64, the longitudinal bore in the upper threaded plug 71 and the angular bore in the journal of the upper control housing cover 70 through the upper flange surface comprising the upper control passages StO and to the interior of the control valve through said control passage. Only if the power piston 17 is abutting against the relief valve member 82 and moves it against the effect of the spring 83, will the upper control passage be connected with the atmosphere. With this, the pressure above the valve member 66 in the control housing and the bores will drop, and the ball valve member 66 will be pressed against the upper valve seat by the compressed air present below the ball. By this, the passage for the compressed air through the upper O-ring 64 will be blocked. Accordingly, atmospheric pressure will now prevail on the upper side of the control piston 61 with the pressure of the compressed air prevailing on the underside and, therefore, the control piston will be driven upwardly and will in so doing take along with it the slide disposed in the contraction of the piston along the slide valve face plate. In order to attentuate the impact of the control piston 61 against the control housing cover 70, the pins 73 lift the valve body 66 from the valve seat shortly before the impact occurs. In this manner, the subsequent reversing operation is facilitated at the same time because, at this moment, the valve member 66 of the check valve is freely floating between the valve seating rings 64. The control valve now exposes the main passage HO and connects the main passage HU with the air outlet LA. Immediately on completion of the reversal operation, the compressed air may flow through the lower O-ring 64 and the lower control passage S*t*U to the lower control valve. With this, the lower valve is prepared for the next reversal. During the downward movement of the piston the roles of the mirror-symmetrically arranged valves and parts in the control housing are exactly exchanged. The effect of the working piston obtained during the movement of the power piston and thus the effect of the delivery member is as follows:

During the upward stroke of the working piston, the ball valve in the working piston is closed, the suction valve is open. During this stroke, the amount of the material to be delivered which corresponds to the differential diameter between the working piston and the piston rod is expelled at FA. At the same time, the amount corresponding to the diameter of the working piston is drawn in at FE. During the downward stroke, the suction valve closes, and the ball valve in the working piston opens and an amount of material to be delivered in correspondence with the differential diameter between working piston and piston rod is again delivered.

In the control housing shown in FIG. 3, two control valve piston bushings 58 are provided which are sealing the inner space of the control valve housing 51' by means of O-ring 59 with respect to both the control passages and the atmosphere. The drawing shows only the lower O-rings which are effecting a sealing against the lower control passage S*t*U. A sealing with respect to the upper control passage (not shown) is correspondingly effected by means of upper O-rings arranged in the same manner. The control valve piston bushings 58 are retained by means of fastenings screws 53' to the control valve housing 51'. The fastening screws 53' are extending into contractions of the control valve piston bushing 58 forming the control passages.

The control valve piston 61' is arranged axially displaceably within the control piston bushings 58. The control valve piston 61' is provided with an axial bore with the ball 66' disposed therein between the O-rings 64', said O-rings 64' being spaced from one another through a distance necessary to afford freedom of movement to the ball 66' by the bushing 65'. The O-rings 64', the bushings 65 and the ball 66' are forming a ball valve. Within the bore of the control piston 61', two spacer sleeves 62 are abutting the O-rings 64'. The retainer elements for the spacer sleeves 62 are formed by circlips 63.

The governing slide valve 67' is disposed within a contraction of the control piston 61' and is pressed against the slide valve face plate 69' by means of a spring (not shown). In the control piston sleeve 58, there is provided another notch E which is in communication with the interior of the control housing via passages shown in dotted lines. The slide valve face plate 69' is flanged and sealed with respect to the control housing by means of fastening screws 54 extending through a control housing cover 70.

The relief valve shown in the drawing only in the lower cylinder cover consists of the threaded insert 81' screwed into that side of the cylinder cover 13' which is forming the inner side after assembly. Apertured discs 84 are provided in the valve through which a communication between the chamber of the lower cylinder and the control passage S*t*U is established. In the relief valve, the valve member 82' is arrange axially movably, the valve plate of which keeps the valve closed under the pressure of the closing spring 83'.

Into the lower control valve piston bushing 58, a plug 94 sealed by means of an O-ring 95 is projecting and is connected with a reducing valve 93. The reducing valve 93 is connected with the distributor 91 through which the propellant gas may flow in via LE after a shut-off valve 92 has been opened. A manometer 96 is provided between the reducing valve 93 and the plug 94, and an exhaust valve 97 is provided at the distributor 91.

The mode of operation of the control in accordance with the invention as shown in FIG. 3 is as follows:

The propellant gas enters the distributor 91 at LE' (FIG. 4) and, after the shut-off valve 92 has been opened, flows into the lower control valve piston bushing 58 through the reducing valve 93, with the plug 94 projecting into said lower control piston bushing 58. The propellant gas flows through the radial bores and into the notch E from where a connection is established with the interior of the control housing 51' by passages formed therein by casting, said passages being shown in the drawing in dotted lines. The drawing shows the condition which is prevailing after the reversal has just been effected. The propellant gas present above the power piston 17' flows through the upper main passage HO' partially shown in dotted lines, through the slide governing valve 67' and the opening LA' into the open atmosphere. Fresh propellant gas is flowing from the interior of the control housing 51' below the piston 17' through the lower main passage (not shown) arranged as mirror image of the upper main passage HO' and connected with the opening HU' and drives the piston 17' upwardly.

During the entire upward stroke, the inlet pressure of the propellant gas had been prevailing inside the control valve. Shortly before the reversal, atmospheric pressure was prevailing below the piston 17' because the underside of the cylinder had been connected with the opening HU' and the opening LA' via the discharge passage. Owing to this connection and the effect of the closure spring 83', the upperside of the collar of the valve member 82' was disposed closely at the inside of the threaded insert 81' and closed the axial bores formed therein. If now the power piston 17' presses the valve member 82' away from the abutment surface the lower control passage STU' will be connected with the space below the control piston 61' through axial bores in the control piston bushing 58, said space below the control piston 61' then being connected with the openings HU' and LA' via the cylinder underside and the lower main passage (not shown), and thus vented to the atmosphere. Owing to the differential pressure created in the control housing the check valve in the control piston formed by the ball 66' with O-rings 64' will close. The control valve piston 61' is driven downwardly taking the governing slide valve 67' along with it and effecting the reversal. The propellant gas now flowing in below the power piston 17' with the control valve still open establishes again the inlet pressure in the control line STU' and also below the control piston 61', thus making possible the next reversal.

In the following, the mode of operation of the delivery part will still be described:

In the upward stroke shown in the drawing just initiated, the ball valve 41' is closed, the ball valve 40' which is working as a suction valve and the ball valve 41' which is working as a check valve are open. At the opening FA', the amount of material to be delivered which corresponds to the difference in diameter of the differential piston 38 is forced away; the amount of material to be delivered corresponding to the large diameter of the differential piston 38 is drawn in through the opening FE'. At the downward stroke the ball valve 40' closes, the ball valve 41' opens, so that the amount of material to be delivered which corresponds to the difference in diameter is again urged away from the opening FA'.

The adjusted pressure of the propellant gas may be taken from the manometer 96. The venting valve 97 makes possible a purging of the individual parts by means of propellant gas. The filling connecting 98 allows for the introduction of solvents and similar substances to clean the portion of the differential piston projecting from the upper roof-type collar set. The closure screw 99 is provided to drain the solvent.

As material to be delivered, preferably, liquids, especially paints, lacquers and similar coating materials are contemplated.

In accordance with FIG. 5, a motor piston 17″ is displaceably supported at a piston rod 25″ in a motor housing 11‴, so that an upper working room 117 and a lower working room 118 are formed. The supply to and discharge from the working rooms 117 and 118 of the gaseous fluid for the operation of the motor takes place via conduits HU″ and HO″. These conduits are connected to a valve block 69‴ and may be connected alternately to an outlet LA″ or an inlet LE″ with the aid of a control slide 67‴. The inlet LE″ for the pressurized fluid is provided in the medium portion of the valve block 69‴. In this valve block 69‴, a control valve piston 61″ is guided for axial movement in control piston bushings 51″ and is mechanically coupled with the slide valve 67‴. The control valve piston 61″ and the slide 67‴ together form the main control valve.

The control valve piston 61″ is provided with sealing rings 62′ at both its ends so that during its movement it forms control pressure chambers 110 of variable volume between its ends and the adjacent control piston bushings. Each of these control pressure chambers 110 is connected with the interior of a relief valve 180 via a conduit 130, the housing 181 of said relief valve 180 being sealingly screwed into an end face of the motor housing 11‴. A communication channel 105 provided in the relief valve housing extends between the inner space of the relief valve housing 181 and the smaller working room 118 of the motor cylinder 17″ remaining at the respective dead center position of the motor piston 17″. At its end disposed inside the relief valve housing 181, said communication channel 105 is sealed against the interior of said relief valve housing 181 along a sealing annular surface 107 by means of a bonnet-shaped sealing or valve closing member 106. An actuating pin 182 which is of smaller cross sectional area than the communication channel 105 is displaceably supported in said communication channel 105, said actuating pin extending into the motor cylinder in such a manner that it may be pushed forwardly into the relief valve housing 181 by the motor piston 17″ when said piston approaches its dead center position. The other end of the pin 182 is supported on the inside of the bonnet-shaped sealing or valve closing member 106 via a pressure spring 183. The sealing or valve closing member 106 may be guided in a manner known per se (not shown) for instance, with the use of a weak spring 119, which at the same time initiates the closing movement of the valve closing member.

The control piston valve 61″ which is axially displaceably supported in the control piston bushings 51″, is provided with a through bore 63′ in the center of which there are provided two valve seats for a check valve member 66′ as well as a control bore 120. It is possible in dependence upon the position of the valve member 66″ to shut-off the one of the two halves of the through bore 63′, and the other half may be connected with the pressurized fluid intake LE″. Movement of the check valve member 66″ takes place under the influence of the pressure engaging thereat. The control valve piston 61″ may be displaced under the influence of the pressures prevailing in the control pressure chambers 110. FIG. 5 shows one end position of the control piston valve 61″ in which the upper control pressure chamber 110 is completely occupied by the control piston 61″ while at the lower end of the control piston the control chamber 110 shows its maximum volume. With the governing slide valve 67‴ in the position as shown, the upper conduit HO″ is connected with the fluid intake LE″ and the lower conduit HU″ is connected with the outlet LA″. Consequently, the high pressure of the fluid intake LE″ prevails in the working room 117 of the motor housing 11‴, and the lower pressure of the outlet LA″ prevails in the lower working room 118 of the motor housing 11‴. Thus, the piston 17″ may move downwardly.

In the following, the mode of operation of the servomotor according to the invention will be described. If the piston 17″ on its downward travel as shown in FIG. 5 approaches the lower dead center position, it will push the actuating pin 182 of the lower control valve 180 inwardly. In the lower working room 118, in the communication channel 105 and in the interior of the sealing bonnet 106, the lower pressure of the outlet LA prevails via conduit HU″. In the relief valve housing 181, in the conduit 130 and in the pertaining control pressure chamber 110, however, the high pressure of the fluid intake LE″ prevails, because the control piston valve 61″ just has been pushed into the end position as shown by the said pressure. Thus, there is a considerable pressure differential across the sealing bonnet 106 which presses the sealing bonnet 106 tightly upon its sealing annular seat 107. The forward pushing movement of the actuating pin 182 caused by the piston 17″ approaching its dead center position thus at the beginning only causes a compression of the pressure spring 183. At a certain moment of this operation, however, at the latest when the inner end of the actuating pin 182 strikes against the inside of the sealing bonnet 106, the sealing bonnet will be lifted more or less slowly in dependence upon the speed of the piston 17″. As soon as only the slightest leak occurs hereby in the sealing surface 107, the highly pressurized fluid will flow through this point of leakage thereby reducing the pressure differential across the sealing bonnet 106 so that the sealing bonnet will open under the influence of the pressure spring 183 and, under the influence of the progressive reduction in the pressure difference effective in a closing sense which is taking place along with said opening, will be fully opened at a great velocity. This operation, however, once initiated by the first small leakage spot at the sealing line 107, is completely independent of the speed of the motor piston 17″. The pertaining control pressure chamber 110 will be relieved rather quickly by the sudden opening of the communication channel 105. The check valve member 66″ is strongly pressed onto the lower valve seat owing to the sudden pressure drop created thereby in the lower half of the through-bore 63′, thus closing the through-bore 63′. The control valve piston 61″ is pushed downwardly under a considerable force exerted by the high pressure of the fluid intake LE″ prevailing in the control valve chamber at the upper end of the through-bore. Thereby, the piston 67‴ is displaced into the other end position so that now the upper conduit HO″ is connected with the outlet LA″ and the lower conduit is connected with the fluid intake LE″. As a result, now, the lower working room 118 is pressurized, while the upper working room 117 is relieved through the conduit HO″. As will be seen without any further ado, the sealing bonnet of the upper control valve is thereby closely pressed into sealing engagement on its sealing seat owing to the high pressure prevailing at the upper end of the control valve piston 61″, so that now the upper relief valve may be operated in the same manner as has already been described herein. The lower control pressure chamber 110 which has been reduced to its minimum volume is likewise pressurized via the communication channel 105; the control valve 180 which has been opened due to the effect of the compression spring 183, and the conduit 130.

FIGS. 6 and 7 show a slightly different embodiment of a control piston valve similar to 61″ for a servo-motor in accordance with the invention. In this embodiment, two bores 101 and 102 are provided instead of the through-bore 63, said two bores 101 and 102 in the manner as shown leading to orifices provided in two essentially plane valve seat areas 103 and 104 abutting each other at obtuse angles. These valve seat areas are provided in a piston valve center portion of reduced diameter on the outer surface of the piston, so that they are subjected to the pressure of the fluid prevailing at the fluid intake LE. At the point where the two valve seat areas 103 and 104 are abutting each other, there is provided a valve member in the form of a light valve flap 166 which is pivotally supported with the aid of a retaining pin 108, so that with a reduced pressure occurring in one of the bores 101 or 102 said valve member is sealingly pressed onto the pertaining orifice by the flow then created. Compared to a valve ball, the inertness of the valve flap 166 may be kept considerably lower by suspending it in the center of gravity, so that there will be no more delays in the shifting operation caused by the inertia or the weight of the valve member.

FIG. 8 shows another possible embodiment of a servomotor in accordance with the invention in which, apart from a slightly different fluid supply to the working rooms, blow-off or release valves 111 are provided. Each of the cylinder covers of the motor housing 11''' has sealingly screwed therein a blow-off valve 111. The blow-off valve 111 essentially consists of a blow-off valve cylinder 112 serving as a housing, and a closing piston 113 sealingly guided therein. One end of the closing piston is provided with an annular protruding valve closing member. The closing piston 113 in the one end position thereof may sealingly close at an annular valve seat 121, a passage 115 leading to an adjacent working room. The valve piston 113 is biased at the opposite end thereof by means of a spring 116 and via a connection 114 by the pressure of that control pressure chamber 110' which is connected to the control valve 180' of the other cylinder cover.

Besides, in the embodiment in accordance with FIG. 8, the piston rod 125 is hollow. A tubular rod 127 fastened to the cover 128 of the cylinder extends into the bore 126. The conduit HU''' extends from the housing 69''' of the control valve 61''' and the governing valve 67''' through the cover 128, then passes through the interior of the tubular rod 127 and the bore 126 of the piston rod. The bore 126 is connected with the underside HU'''' of the power cylinder 11''' via transverse bores 129. The tubular rod 127 sealingly passes through the piston 17'''.

The conduit HO''' reaches the upper surface 117 of the power cylinder directly from the housing 69''' of the control valve 61'''.

It will be seen without any detailed explanation of the slightly different formation of the main control valve of the control slide utilized in this embodiment, that in the working position as shown in FIG. 8, the piston 17''' will move upwardly. The right-hand control chamber 110' is pressurized, and the upper working room of the cylinder 11''' is connected with the outlet LA''' so that the valve piston 113 of the blow-off valve 111 is closely pressed onto its valve seat 121. The blow-off bores 122 provided between the valve seat 121 and the sealing piston rings of the valve piston 113, consequently, are connected neither with the conduit 114 nor with the passage 115 leading to the cylinder room 117 or 118. If the piston 71''' approaches its upper dead center position and is reversed very suddenly in the manner which has been described above, the pressure in the right-hand control pressure chamber 110' will most suddenly drop and with it also the pressure below the valve piston 113 via the conduit 114. The valve piston 113 therefore is thrown downwardly with considerable force by the high pressure prevailing in the lower working room, and the lower working room of the cylinder 11''' is largely relieved from pressure in a very short period of time through the blow-off bores 122 designed to have a great cross sectional area. The piston 17''' thus immediately after its reversal will find no counterpressure any more on its underside and may immediately start its return stroke downwardly at full force.

In order to obtain a quick closure of the blow-off or release valve, the cross sectional area of the valve piston 113 effective at the passage 115 may be either smaller than the effective cross sectional area of the opposite side disposed inside the blow-off valve housing 112, or the valve piston 113 may be biased in the closing direction by a spring 116 as shown in FIG. 8.

What I claim is:

1. A control for a double acting, pressurized medium, expansible motor comprising, in combination, a cylinder having first and second opposed heads, a piston reciprocally mounted within said cylinder having first and second pressure faces, said first head and face defining a first cylinder chamber and said second head and face defining a second cylinder chamber, a control valve member housing having a bore defined therein having first and second ends and an intermediate portion, a control valve member reciprocally mounted within said bore having first and second ends facing said bore first and second ends, respectively, and an intermediate portion, first and second axial extending passages defined in said valve member establishing communication between said intermediate portion of said valve member and said first and second ends thereof respectively, port means establishing communication between said bore and valve member intermediate portions, check valve means carried by said valve member at said intermediate portion thereof adapted to selectively control the flow of pressurized medium from said housing intermediate portion through said first and second passages, pressurized medium supply means communicating with said bore intermediate portion, first and second pressure relief means mounted upon said cylinder operable by said piston upon said piston approaching said first and second heads, respectively, means establishing communication between said first relief means and said bore first end and said second relief means and said bore second end, first and second primary passages communicating with said first and second cylinder chambers, and piston reversing valve means communicating with said primary passages, said reversing valve means including pressurized medium inlet ports and an exhaust port and port operator means selectively positioned by said control valve member whereby said control valve member and reversing valve means are shifted between first and second positions upon said pressure relief means being alternately operated by said piston.

2. A control as in claim 1 wherein said pressure relief means each include a pressure release port directly communicating with the atmosphere.

3. A control as in claim 1 wherein said pressure relief means each include a pressure release port communicating with the adjacent cylinder chamber.

4. A control as in claim 1 wherein said check valve means includes a ball carried by said control valve member intermediate portion communicating with said port means, said valve member axial passages being coaxial and each including a seat at said valve member intermediate portion, said ball being located intermediate said seats.

5. A control as in claim 1 wherein said check valve means comprises two flat surface valve seats defined on said valve member angularly disposed with respect to each other and forming an edge, said valve seats being defined in said passages, a plate-like valve closing member supported on said edge for producing a rocking movement to selectively close said valve seats, and a retaining element retaining said plate-like member at said edge.

6. A control as in claim 1 wherein said pressure relief means each comprise a cup-like relief valve closing member, a relief valve seat communicating with the associated chamber of said cylinder and encompassing channel means connecting the interior of said cup-like relief valve closing member to said associated chamber, a trigger element entering the interior of said cup-like relief valve closing member and adapted to engage said cup-like relief valve closing member, said trigger extending into the associated chamber for engagement with said piston, first resilient means biasing said trigger element away from engagement with said relief valve closing member, and second resilient means biasing said relief valve closing member onto said relief valve seat.

7. In a control as in claim 1, a blow-off valve communicating with each cylinder chamber, each blow-off valve including an exhaust port, a piston type valve element movably mounted within each blow-off valve having a pressure face and adapted to selectively seal its associated exhaust port upon said pressure face being subjected to pressurized medium, the pressure face of the blow-off valve communicating with said first cylinder chamber communicating with said second pressure relief means and the pressure face of the blow-off valve communicating with said second cylinder chamber communicating with said first pressure relief means.

References Cited

UNITED STATES PATENTS

| | | | |
|---|---|---|---|
| 172,839 | 2/1876 | Wilcox | 91—305 |
| 870,391 | 11/1907 | Starrett | 91—306 |
| 3,070,023 | 12/1962 | Glasgow | 91—305 |
| 3,162,093 | 12/1964 | Zoller | 91—306 |
| 3,282,167 | 11/1966 | McKenzie | 91—306 |

PAUL E. MASLOUSKY, *Primary Examiner.*